(12) United States Patent
Morita

(10) Patent No.: US 7,702,807 B2
(45) Date of Patent: Apr. 20, 2010

(54) SYSTEM AND METHOD FOR PROVIDING CONTENT, AND RELAY APPARATUS

(75) Inventor: Toru Morita, Tokyo (JP)

(73) Assignee: Sony Computer Entertainment Inc. (JP)

( * ) Notice: Subject to any disclaimer, the term of this patent is extended or adjusted under 35 U.S.C. 154(b) by 779 days.

(21) Appl. No.: 10/027,561

(22) Filed: Dec. 20, 2001

(65) Prior Publication Data
US 2002/0116456 A1 Aug. 22, 2002

(30) Foreign Application Priority Data

Dec. 21, 2000 (JP) ............... 2000-388810
Dec. 20, 2001 (JP) ............... 2001-388337

(51) Int. Cl.
*G06F 15/16* (2006.01)

(52) U.S. Cl. ............ 709/238; 709/201; 709/203; 709/216; 709/217; 709/218

(58) Field of Classification Search ........ 709/217, 709/227, 249, 203, 201, 216, 218; 455/412, 455/456, 450; 463/40, 41, 9, 1; 713/82, 713/182

See application file for complete search history.

(56) References Cited

U.S. PATENT DOCUMENTS

| | | | |
|---|---|---|---|
| 5,273,288 | A | 12/1993 | Teshima et al. |
| 6,148,253 | A * | 11/2000 | Taguchi et al. ............ 701/48 |
| 6,370,394 | B1 * | 4/2002 | Anttila ............ 455/417 |
| 6,381,318 | B1 | 4/2002 | Nada et al. |
| 6,561,901 | B1 | 5/2003 | Takase |
| 6,694,133 | B1 * | 2/2004 | Tobita et al. ........ 455/414.1 |
| 6,709,330 | B1 * | 3/2004 | Klein et al. ............ 463/9 |
| 2001/0025275 | A1 * | 9/2001 | Tanaka et al. ........... 705/412 |
| 2002/0042825 | A1 * | 4/2002 | Gee ............ 709/227 |
| 2002/0147790 | A1 * | 10/2002 | Snow ............ 709/217 |

(Continued)

FOREIGN PATENT DOCUMENTS

CN  1205483  1/1999

(Continued)

OTHER PUBLICATIONS

Office Action dated Dec. 14, 2007, for EP Patent Application No. 01994987.4 corresponding to this application.

(Continued)

*Primary Examiner*—Djenane M Bayard
(74) *Attorney, Agent, or Firm*—Lerner, David, Littenberg, Krumholz & Mentlik, LLP

(57) ABSTRACT

Disclosed are a content providing system and a relay apparatus in which an information terminal connected to a multi-function mobile telephone receives a content in the same operational procedure as that for the multi-function mobile telephone. When a video gaming machine connected to the multi-function mobile telephone accesses a content providing apparatus, an DNS server in an NOC converts a telephone number of the multi-function mobile telephone into an ID code unique to the multi-function mobile telephone. The content providing apparatus thus identifies the multi-function mobile telephone in use, and a user can thus enjoy a video game on the video gaming machine in the same operation as that for the multi-function mobile telephone.

12 Claims, 6 Drawing Sheets

U.S. PATENT DOCUMENTS

| | | | |
|---|---|---|---|
| 2003/0060247 A1* | 3/2003 | Goldberg et al. | 463/1 |
| 2003/0114224 A1* | 6/2003 | Anttila et al. | 463/40 |
| 2003/0171147 A1* | 9/2003 | Sinclair et al. | 463/39 |
| 2004/0043770 A1* | 3/2004 | Amit et al. | 455/450 |
| 2005/0021863 A1* | 1/2005 | Jungck | 709/246 |
| 2005/0193209 A1* | 9/2005 | Saunders et al. | 713/182 |

FOREIGN PATENT DOCUMENTS

| | | |
|---|---|---|
| DE | 19911782 | 9/2000 |
| EP | 1 028 569 A | 8/2000 |
| JP | 10-322445 A | 12/1998 |
| JP | 2001-144749 A | 5/2001 |
| JP | 2002-64649 A | 2/2002 |
| KR | 1996-0001088 | 12/1993 |
| KR | 2000-0054639 | 9/2000 |

OTHER PUBLICATIONS

Office Action from corresponding Korean Application 10-2003-707241, dated Sep. 26, 2008.

Office Action from corresponding Chinese applicaton 01821182.8, dated Nov. 7, 2008.

Office Action from corresponding Chinese applicaton 01821182.8, dated Mar. 6, 2009.

* cited by examiner

# SYSTEM AND METHOD FOR PROVIDING CONTENT, AND RELAY APPARATUS

FIELD OF THE INVENTION

The present invention relates to a method, a system and a relay apparatus in the system appropriate for use in providing an entertainment content such as a video gaming software program.

BACKGROUND OF THE INVENTION

The Internet is now widespread use as personal computers become ubiquitous. The Internet links the entire world, and anyone easily accesses it for data collection. Web sites for providing a diversity of types of contents are connected to the Internet. Using the Internet, one can easily and quickly gain access to not only mere information, but also entertainment contents such as music, and software programs for video gaming.

In game playing using the Internet, an information terminal is not identified if a player is identified with an ID (identification) number and a password. A user can enjoy game playing on his home personal computer or on a computer in other places. Even if the user stops playing in the middle of a game, the progress of the game is saved in a Web site that provides a game content. For example, when the user suspends the game in the middle thereof at home, he may continue game playing until the end thereof on a personal computer in other places.

As mobile telephones such as PHS (Personal Handy-phone Systems) or portable telephones are widely used, more and more people communicate over mobile telephones. Multi-function mobile telephones, having a function of serving as an information terminal with an Internet connection capability, appear in the market. Among multi-function mobile telephones, some provide an "i mode" service available from the NTT DoCoMo in Japan (formerly, "Nippon Telegraph & Telephone Mobile Communications Network, Inc,").

A Web browser and an E-mail software, which are standard applications working on the Internet, are installed in such a multi-function mobile telephone. Using the multi-function mobile telephone, the user views home pages set in numerous Web sites over the Internet. The user plays a video game on the multi-function mobile telephone by connecting the multi-function mobile telephone to a site that provides a game content and downloading the game content thereto. In this way, the user can enjoy video game playing anywhere.

A mobile telephone service company which provides mobile telephone service owns a gateway as a relay apparatus which interfaces a communication network to the Internet for the multi-function mobile telephone to gain access to the Internet. Since the multi-function mobile telephone accesses each site over the Internet through the gateway, the gateway recognizes that a pay content is downloaded from a pay site to the multi-function mobile telephone when the multi-function mobile telephone accesses the pay site. The mobile telephone service company thus bills a fee of the pay content to an owner of the multi-function mobile telephone. Since the multi-function mobile telephone is identified from a telephone number, the user is free from an operation to input an ID number and a password on the multi-function mobile telephone to identify himself.

With an information terminal such as a personal computer connected to the multi-function mobile telephone, the user may access each site over the Internet from the information terminal through a mobile telephone network. If the mobile telephone is combined with a mobile computer, the user can obtain required information from the Internet anywhere like with the multi-function mobile telephone.

When the information terminal connected to the multi-function mobile telephone accesses the Internet, the multi-function mobile telephone merely functions as an interface, and remains unrelated to the data exchanged between the information terminal and each site. When the multi-function mobile telephone does not directly access the Internet, the mobile telephone service company is unable to learn the content communicated by the multi-function mobile telephone from the standpoint of privacy protection. Since communications are performed between the information terminal and each site with the gateway bypassed, the company has a technical difficulty in learning the content communicated by the multi-function mobile telephone.

When the information terminal connected to the multi-function mobile telephone accesses the Internet, a billing destination needs to be clarified by inputting an ID number and a password. In this way, operational steps become more complex when the multi-function mobile telephone is used as a mere interface than when the multi-function mobile telephone itself accesses the Internet.

SUMMARY OF THE INVENTION

Accordingly, it is an object of the present invention to provide a content providing system and a relay apparatus for use in the system which overcomes the above problem.

The present invention in a first aspect relates to a system for providing a content and includes communication means, including a subscriber telephone network, for establishing a communication line between a mobile telephone and another telephone when the mobile telephone is dialed up, a content providing apparatus for providing the content represented by a digital signal to an information terminal, and a relay apparatus which is connected to a multi-function mobile telephone, having the function as the information terminal, through the subscriber telephone network, and converts a telephone number notified of by the multi-function mobile telephone into an ID code unique to the multi-function mobile telephone, wherein communication between the multi-function mobile telephone and the content providing apparatus is performed through the relay apparatus.

For example, the multi-function mobile telephone having the function of the information terminal may be a mobile telephone compatible with the "i-mode" service provided by the NTT DoCoMo in Japan, a mobile telephone compatible with "EZweb" service provided by KDDI CORPORATION in Japan, a mobile telephone compatible with "J-SKY" service provided by J-PHONE Co., Ltd. in Japan, and a mobile telephone compatible with an Internet connection service similar to one of these.

In accordance with the first aspect of the present invention, the information terminal connected to the multi-function mobile telephone accesses the content providing apparatus connected to a predetermined digital communication network, and the content providing apparatus identifies the multi-function mobile telephone connected to the information terminal based on the ID code converted by the relay apparatus. This arrangement sets the user free from an operation to input an ID number and a password when the user accesses the content providing apparatus. The user thus receives the content in the same operational step as that used to access the content providing apparatus through the multi-function mobile telephone. Since the telephone number, etc., of the multi-function mobile telephone are not transmitted to the content providing apparatus, the privacy of the owner of the multi-function mobile telephone is protected.

Preferably, an information terminal having a display device larger in size than the multi-function mobile telephone is connected to the multi-function mobile telephone and the communication means includes the Internet. In this arrangement, the user views information provided by each site over the Internet, on the large display device of the information terminal. When a content provided by the content providing apparatus is a video game, the user enjoys the game on a screen larger than that of the multi-function mobile telephone. The user is thus happier with game playing.

The relay apparatus may be a gateway arranged to the subscriber telephone network to connect the subscriber telephone network to the Internet, or may be an DNS (Domain Name System) server owned by an Internet service provider, and connected to the multi-function mobile telephone through the subscriber telephone network.

Since the gateway converts the telephone number into the ID code, a fee billing process for a pay content may be performed by a mobile telephone service company which performs a mobile communication service. Since the DNS server converts the telephone number to the ID code, a provider, who owns the DNS server and has contracted with an owner of the multi-function mobile telephone, performs a fee billing process for a pay content. Payment destinations are unified to a single entity, and the user is free from inconvenience involved in paying fees if the user receives contents from a number of content providing apparatuses. In this way, the user smoothly purchases a pay content from a content provider who delivers pay contents such as music contents or game software programs through the Internet.

Preferably, the content providing apparatus is an Internet server which provides a program and/or data for video gaming as an entertainment content. In this way, the Internet server saves the progress of game playing, thereby verifying the compatibility of the information terminal connected to the multi-function mobile telephone with the multi-function mobile telephone. When the user goes out after stopping game playing in the middle thereof on the information terminal connected to the multi-function mobile telephone at home, the user may resume game playing on the multi-function mobile telephone at any place the user prefers later.

Preferably, the information terminal connected to the multi-function mobile telephone is a video gaming machine which is operated while monitoring an image presented on the display device thereof This arrangement permits the user to enjoy a latest game playing software program without going to a retailer for shopping the software program. The game may also be enjoyed on the multi-function mobile telephone. Since the video gaming machine is equipped with a browser function, Internet home pages are viewed by using the video gaming machine and the multi-function mobile telephone alone. This arrangement eliminates the need for the information terminal such as a personal computer, which typically requires complex operational steps. The ease of use of the Internet is thus assured.

The present invention in a second aspect relates to a relay apparatus for use in a content providing system including communication means, including a subscriber telephone network, for establishing a communication line between a mobile telephone and another telephone when the mobile telephone is dialed up, and a content providing apparatus for providing the content represented by a digital signal to an information terminal through the communication means. The relay apparatus is connected to a multi-function mobile telephone, having a function of serving as the information terminal, through the subscriber telephone network, converts a telephone number notified of by the multi-function mobile telephone into an ID code unique to the multi-function mobile telephone, and relays communications between the multi-function mobile telephone and the content providing apparatus.

In accordance with the second aspect of the present invention, the relay apparatus converts the telephone number into the ID code as already mentioned. When the information terminal connected to the multi-function mobile telephone accesses the content providing apparatus connected to a predetermined digital communication network, the content providing apparatus identifies the multi-function mobile telephone connected to the information terminal based on the ID code converted by the relay apparatus.

This arrangement sets the user free from an operation to input an ID number and a password when the user accesses the content providing apparatus using the information terminal. The user thus receives the content in the same operational step as that used to access the content providing apparatus through the multi-function mobile telephone alone. Since the telephone number of the multi-function mobile telephone is not transmitted to the content providing apparatus, the privacy of the owner of the multi-function mobile telephone is protected.

DESCRIPTION OF THE PREFERRED EMBODIMENTS

Figure 1:
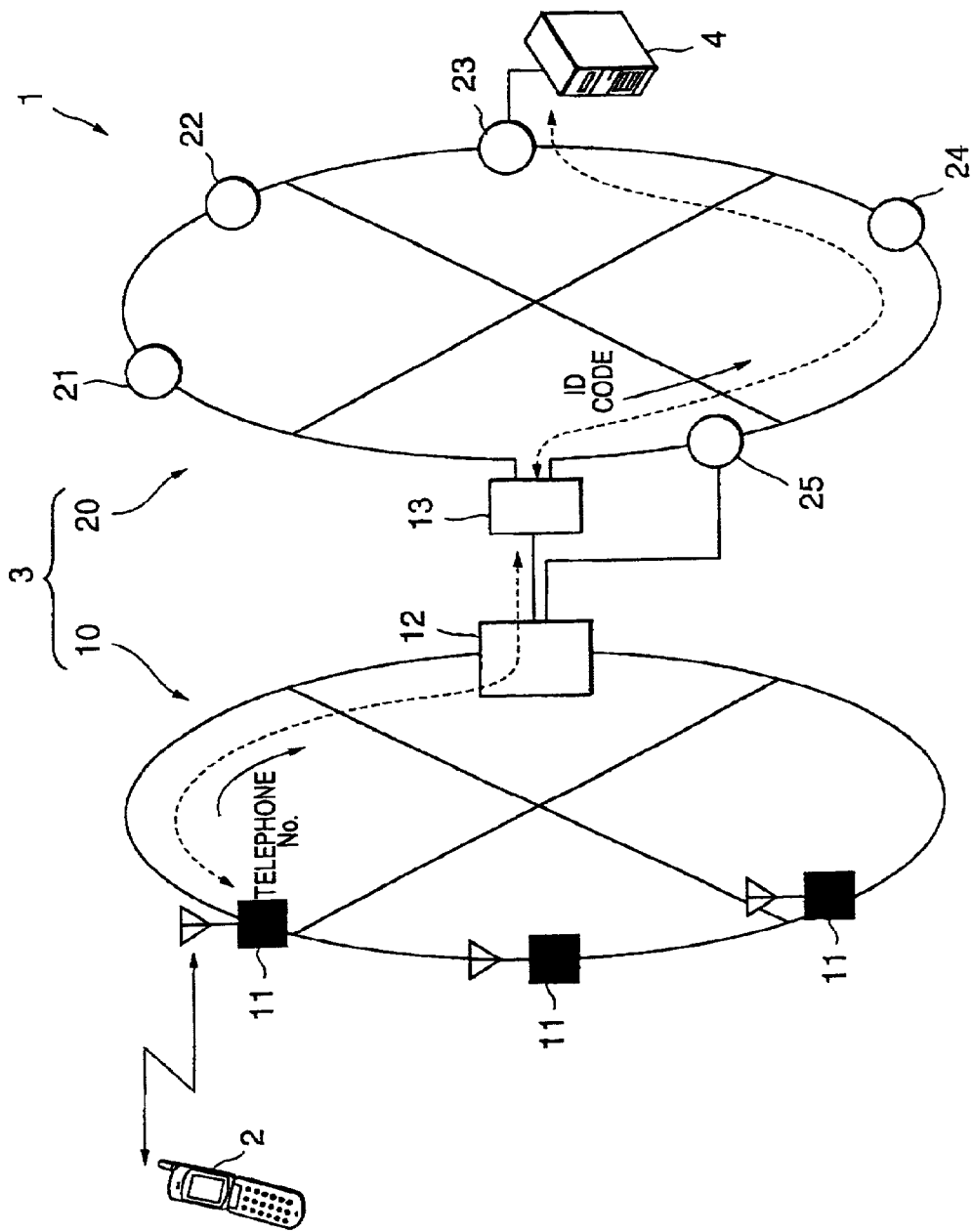
FIG. 1 is a system diagram generally showing a content providing system in one configuration in accordance with one embodiment of the present invention.

One embodiment of the present invention is discussed below referring to the drawings.

FIG. 1 shows a content providing system 1 in accordance with one embodiment of the present invention. The content providing system 1 includes communication means 3. The communication means 3 includes a subscriber telephone network 10 for establishing a communication line between a mobile telephone 2 and another telephone, and the Internet 20. The content providing system 1 further includes a content providing apparatus 4 for providing a content represented by a digital signal to a variety of information terminals through the communication means 3. A user can access the content providing apparatus 4 from the mobile telephone 2 which is connected to the Internet 20 when the mobile telephone 2 is dialed up.

The subscriber telephone network 10 is owned by a mobile telephone service company which provides communication service to mobile communication devices such as mobile telephones. The subscriber telephone network 10 includes a plurality of radio base stations 11 and a plurality of mobile telephone exchanges 12. In this way, mobile communication devices, such as the mobile telephones, belonging to the subscriber telephone network 10, can communicate with each other.

Connected to the mobile telephone exchange 12 is not only the Internet 20 but also a public telephone network for providing communication service through an ordinary wired telephone, a mobile telephone network for providing mobile communication service, a digital communication network for providing digital communication service to computers, etc, (such as the Integrated Services Digital Network, hereinafter referred to ISDN), and other communication networks. Using the mobile telephone 2, one can communicate with an ordinary telephone, a mobile telephone of any mobile telephone service company, or an information terminal such as a computer, connected to the ISDN.

In this embodiment, the mobile telephone 2 is a multi-function mobile telephone having a function of serving as an information terminal, and can access each site over the Internet 20. The multi-function mobile telephone 2 may a mobile telephone compatible with any of Internet connection services provided by mobile telephone service companies in Japan, such as the "i-mode" service provided by the NTT DoCoMo, "EZweb" service provided by KDDI CORPORATION, "J-SKY" service provided by J-PHONE Co., Ltd. Furthermore, the mobile telephone 2 may be a mobile telephone compatible with a similar Internet connection service available abroad.

The Internet 20 includes NOCs (Network Operation Centers) 21-25 respectively owned by a plurality of Internet service providers (hereinafter simply referred to as providers) and mutually connected to each other via a dedicated line for high-speed digital communications. Each of the NOCs 21-25 includes a DNS (Domain Name System) server which converts a URL (Uniform Resource Locator) transmitted from an information terminal or the like into an IP (Internet Protocol) address, and a mail server which exchanges E-mails transmitted from information terminals, although these servers are not shown.

The content providing apparatus 4 is connected to the NOC 23. In this embodiment, the content providing apparatus 4 is an Internet server of a video game supplier which sells video game software programs. In other words, the content providing apparatus 4 sells the video game software programs over the Internet 20.

Figure 5:
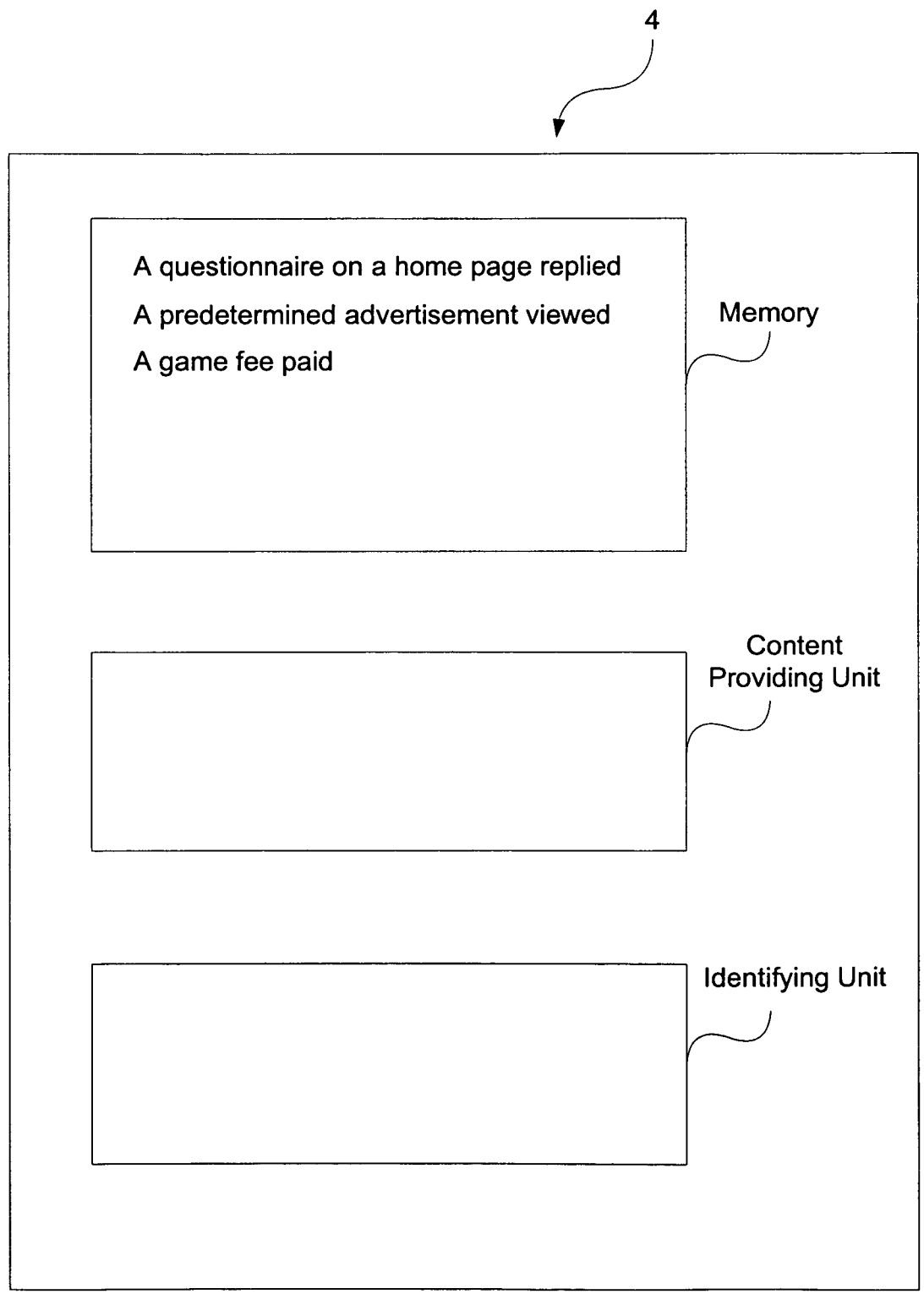
FIG. 5 illustrates a content providing apparatus in accordance with aspects of the invention.

A home page of the video game supplier is opened in the content providing apparatus 4. For example, the home page posts questionnaires to users, and advertisements of new products. As shown in FIG. 5, the content providing apparatus 4 includes a memory for storing a variety of statuses of the multi-function mobile telephones by an ID (Identification) code, and the progress of current game playing. For example, the statuses of the multi-function mobile telephones include "a questionnaire on a home page replied," "a predetermined advertisement viewed," "a game fee paid."

The NOC 25 is installed by a provider run by a mobile telephone service company which owns the subscriber telephone network 10. The information terminal connected to mobile telephone belonging to the subscriber telephone network 10 can be connected to the Internet 20 through the NOC 25. The DNS server arranged in the NOC 25 is a relay apparatus which has a function of converting a telephone number notified of by the multi-function mobile telephone into an ID code (subscriber ID) unique to the multi-function mobile telephone. The DNS server in the NOC 25 is linked to the mobile communication exchange 12 in the subscriber telephone network 10, which in turn is connected to the multi-function mobile telephone 2. When the multi-function mobile telephone 2 is compatible with the "i-mode" of NTT DoCoMo, the NOC 25 is operated by the provider "mopera."

The subscriber telephone network 10 is connected to the Internet 20 through the NOC 13. The NOC 13 includes a gateway (not shown in FIG. 1) which serves as an interface to establish communication between the subscriber telephone network 10 and the Internet 20. The gateway in the NOC 13 is connected to the mobile communication exchange 12 in the subscriber telephone network 10. Since the multi-function mobile telephone 2 is thus connected to the Internet 20 in this way, the user can view each site over the Internet 20 and transmit and receive E-mails through the Internet 20 using the multi-function mobile telephone 2. When the multi-function mobile telephone 2 is a mobile telephone compatible with the "i-mode" of the NTT DoCoMo, the NOC 13 is an "i-mode" center.

The multi-function mobile telephone 2 is thus connected to the Internet 20 through the NOC 13. When a video game software program is delivered from the content providing apparatus 4, the user plays a game on the multi-function mobile telephone 2. The gateway in the NOC 13 sends an ID code unique to the multi-function mobile telephone 2 to the content providing apparatus 4.

In response to the ID code, the content providing apparatus 4 identifies the multi-function mobile telephone 2 to which the video game software program is delivered. The content providing apparatus 4 then saves the progress of game playing if a game is suspended in the middle thereof. When the user resumes game playing later, the progress of the game playing is sent to the multi-function mobile telephone 2. When the user suspends game playing on the multi-function mobile telephone as a game playing machine in the middle thereof, the user easily resumes game playing from the point of suspension by reaccessing the content providing apparatus 4.

Figure 2:
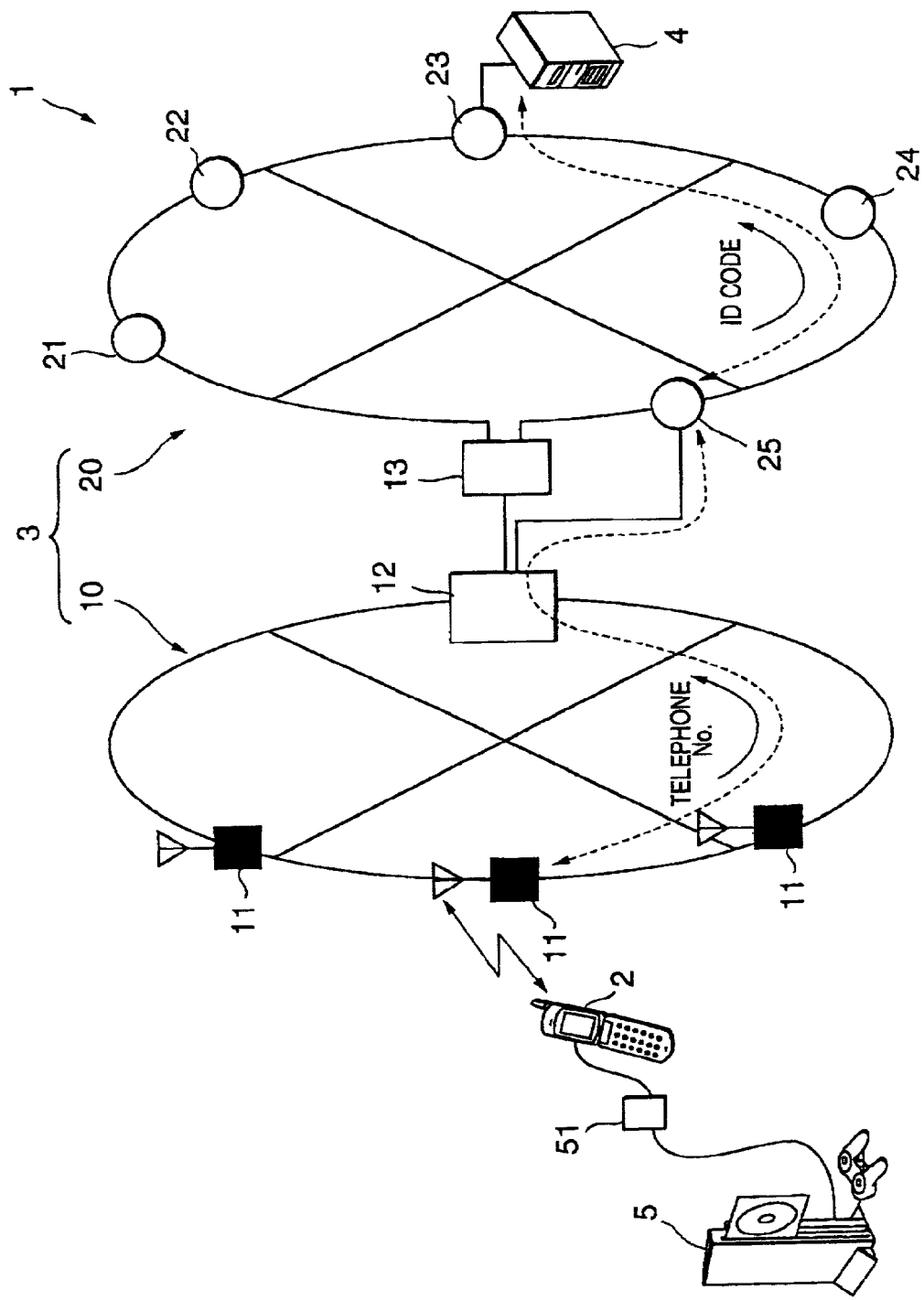
FIG. 2 is a system diagram generally showing the content providing system of present invention in another configuration.

Referring to FIG. 2, a video gaming machine 5 as an information terminal is connected to the multi-function mobile telephone 2 through an interface box 51. The user operates the video gaming machine 5 while viewing an image on a display thereof. The display of the video gaming machine 5, although not shown in FIG. 2, is higher in resolution and larger in size than a display of the multi-function mobile telephone 2.

The video gaming machine 5 connected to the multi-function mobile telephone 2 is connected to the Internet 20 through the NOC 25. When the video gaming machine 5 receives a video game software program from the content providing apparatus 4, the user plays the game on the video gaming machine 5. The DNS server in the NOC 25 converts a telephone number of the multi-function mobile telephone 2 into an ID code unique to the multi-function mobile telephone 2, and transmits the ID code to the content providing apparatus 4.

The transmission process of the ID code into which the telephone number is converted is discussed hereinafter. The DNS server in the NOC 25 detects the telephone number of the multi-function mobile telephone 2 when a dial-up step is performed on the video gaming machine 5 using a communication function of the multi-function mobile telephone 2. The DNS server then converts the telephone number using a conversion table prepared beforehand, and stores the resulting ID code.

Figure 6:
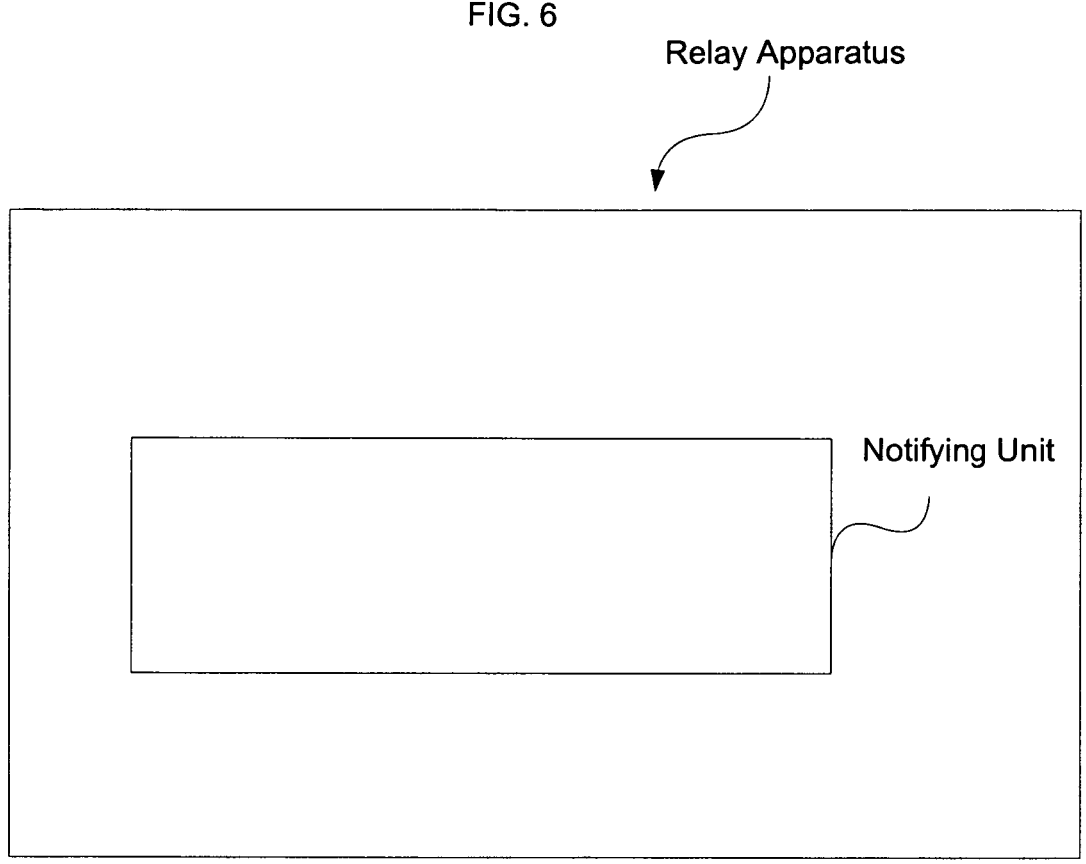
FIG. 6 illustrates a notifying unit of the relay apparatus in accordance with aspects of the invention.

While the video gaming machine 5 is connected, the DNS server in the NOC 25 monitors the connection relationship (sessions such as a http (Hypertext Transport Protocol) session) of the video gaming machine 5 with another computer over the Internet. When the DNS server detects that the video gaming machine 5 has been connected to a registered (authorized) Web server (such as the content providing apparatus 4), the DNS server notifies the content providing apparatus 4 of the ID code corresponding to the video gaming machine 5. FIG. 6 illustrates a notifying unit of the relay apparatus which notifies the content providing apparatus 4 as explained herein.

When the content providing apparatus 4 delivers a content to the user of the video gaming machine 5, the content providing apparatus 4 identifies the user referencing the ID code transmitted from the DNS server (for personal authentication). Based on the ID code, the content providing apparatus 4 manages the state of the content (progress of game playing) used in a particular video gaming machine 5, and calculates a content fee and bills the user for the content fee.

The ID code sent from the DNS server is not necessarily the same as the ID code sent from the gateway. When the ID code sent from the DNS server is different from the ID code sent from the gateway, the content providing apparatus 4 includes a conversion table that converts the ID code from the DNS server into the ID code from the gateway. In this way, the content providing apparatus 4 identifies the multi-function mobile telephone 2.

Based on the ID code, the content providing apparatus 4 identifies the multi-function mobile telephone 2 to which the video gaming machine 5 is connected. The content providing apparatus 4 then saves the progress of game playing even if a game is suspended in the middle thereof on the video gaming machine 5 or the multi-function mobile telephone 2, each of which receives a video game software program from the content providing apparatus 4. When the user resumes game playing the progress of the game playing is sent to the multi-function mobile telephone 2. When the user suspends game playing on the video gaming machine 5 or the multi-function mobile telephone 2 in the middle thereof, the user easily resumes game playing from the point of suspension by reaccessing the content providing apparatus 4 later.

The operation of this embodiment is discussed below.

When the user accesses the content providing apparatus 4 using the video gaming machine 5 to enjoy game playing at home, the content providing apparatus 4 provides a game content to the video gaming machine 5 in response. FIG. 5 illustrates a content providing unit of the content providing apparatus 4 that provides the game content as described above. For example, the game is the one for growing a character such as a virtual living thing or a virtual pet.

The content providing apparatus 4 identifies the multi-function mobile telephone 2 in response to the ID code when a content is delivered. The content providing apparatus 4 requests a mobile telephone service company owning the subscriber telephone network 10 to collect the fee for the supplying of the game content to the video gaming machine 5. The fee is thus collected together with telephone charges. In another payment method, the fee for the game content may be paid in which a bank transfer is made using the multi-function mobile telephone 2 in an Internet banking. If a large amount of sum is handled, not only the ID code to identify the multi-function mobile telephone 2 but also a user ID and a password are preferably used.

When the user goes out with game playing suspended in the middle thereof on the video gaming machine 5, the progress of the game playing is saved in the content providing apparatus 4. The multi-function mobile telephone 2 resumes the game playing from the point of suspension, by reaccessing the content providing apparatus 4 later. Even when the user suspends the game in the middle thereof on the multi-function mobile telephone 2, the content providing apparatus 4 saves the progress of the game playing. The user can resume the game playing from the point of suspension on the video gaming machine 5, by accessing the content providing apparatus 4 through the multi-function mobile telephone 2.

If the user accesses the content providing apparatus 4 when the game playing is in progress and reaches a predetermined phase on the video gaming machine 5 or the multi-function mobile telephone 2, a video granted as a bonus having a value corresponding to the progress of the game playing is presented on a display.

When the user replies to a questionnaire posted on the home page of the content providing apparatus 4, or views advertisements on the home page, or has paid the fee for the game content on the multi-function mobile telephone 2, using the video gaming machine 5 or the multi-function mobile telephone 2, a status stored in the content providing apparatus 4 may be updated from "to be completed" to "completed."

The content providing apparatus 4 downloads a predetermined key code to the video gaming machine 5 when the content providing apparatus 4 confirms the "completed" status in response to the accessing of the video gaming machine 5 to the content providing apparatus 4. The key code is used to release a game content hidden and stored in a storage medium such as a CD-ROM. The user thus enjoys a game, which could not be played on a standalone device, on the video gaming machine 5 which is an otherwise standalone device. The key code is preferably stored in a volatile memory so that the key code is destroyed when the video gaming machine 5 is switched off. Alternatively, the key code may be encrypted and then stored in a non-volatile memory or a disk device, and when the "completed" status is confirmed by the connection to the Internet 20, the key code may be decrypted for use.

The preceding embodiment has the following advantages.

When the video gaming machine 5 connected to the multi-function mobile telephone 2 accesses the content providing apparatus 4 through the Internet 20, the content providing apparatus 4 identifies the multi-function mobile telephone 2 in accordance with the ID code of the multi-function mobile telephone 2 converted by the DNS server of the NOC 25. FIG. 5 illustrates an identifying unit of the content providing apparatus 4 which identifies the multi-function mobile telephone 2 as described above. This arrangement frees the video gaming machine 5 from an operation to input an ID number and a password during accessing. As a result, the video gaming machine 5 may receive the content in the same manner as in an operation in which the multi-function mobile telephone 2 as a standalone unit accesses the content providing apparatus 4. Since the multi-function mobile telephone 2 does not send the telephone number thereof to the content providing apparatus 4, the privacy of the owner of the multi-function mobile telephone 2 is protected. Security over the Internet 20 is thus assured.

Since the video gaming machine 5 having a display larger than that of the multi-function mobile telephone 2 is connected to the multi-function mobile telephone 2, the user can enjoy game playing viewing an overwhelmingly large image presented on a high-resolution and large display screen. As a result, the user is happy with game playing.

The DNS server of the provider operated by the mobile telephone service company who owns the subscriber telephone network 10 converts the telephone number of the multi-function mobile telephone 2 into the ID code. The mobile telephone service company thus performs the fee billing process for the supplying of the game software program as a pay content provided by the content providing apparatus 4. Since payment destinations are unified to a single entity, namely, the mobile telephone service company, the user is free from inconvenience involved in paying fees when the user receives contents from a number of content providing apparatuses. In this way, the user smoothly purchases pay contents from a plurality of content providers who deliver pay contents such as music contents or game software programs through the Internet 20.

Since the content providing apparatus 4 is an Internet server which provides pay contents including a program and data for video gaming, the user enjoys game playing on the video gaming machine 5 connected to the multi-function mobile telephone 2 at home. The user can also enjoy game playing on the multi-function mobile telephone 2 in an office or other places to which the user may go out. When the user goes out after stopping game playing in the middle thereof on the video gaming machine 5 at home, the content providing apparatus 4 saves the progress of game playing. This arrangement assures compatibility of each of the multi-function mobile telephone 2, typically working in a standalone fashion, and the video gaming machine 5 connected to the multi-function mobile telephone 2, with the content providing apparatus 4. As a result, the user can enjoy continuously game playing on the multi-function mobile telephone 2 at any place during the outing.

Since the video gaming machine 5 is connected to the multi-function mobile telephone 2, the user is free from inconvenience of going to a retailer for shopping a latest game playing software program. The user can simply download and enjoy the latest game playing software program. The user can also play the game on the multi-function mobile telephone 2. Since the video gaming machine 5 is equipped with a browser function, Internet home pages are viewed by using the video gaming machine 5 and the multi-function mobile telephone 2. This arrangement eliminates the need for the information terminal such as a personal computer, which typically requires complex operational steps. The ease of use of the Internet 20 is thus assured.

The embodiment of the present invention has been discussed. The present invention is not limited to the this embodiment, and modifications and changes thereof are possible without departing from the scope of the present invention.

Figure 3:
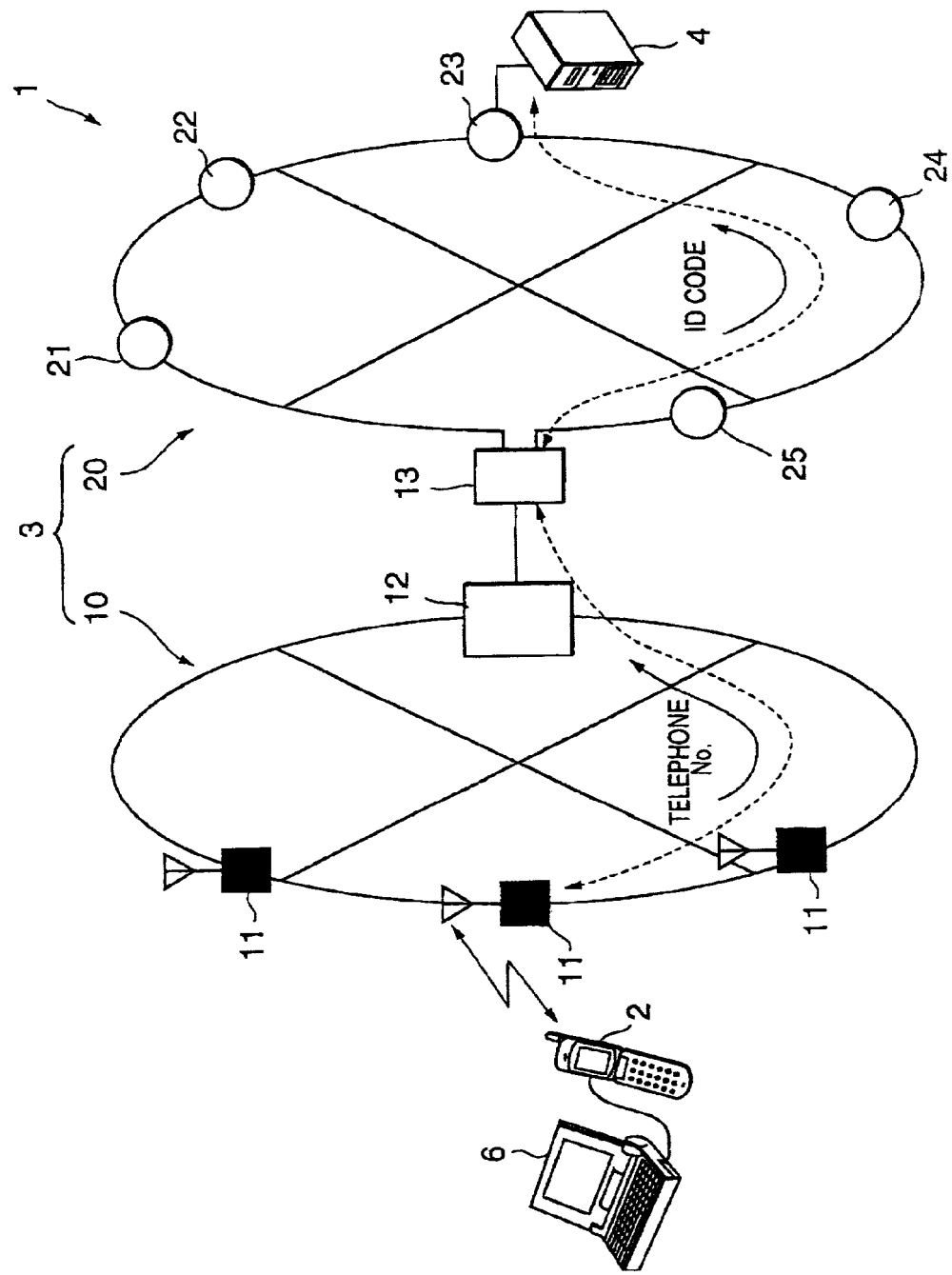
FIG. 3 is a system diagram showing a modification of the content providing system of the present invention.

For example, the information terminal connected to the multi-function mobile telephone is not limited to the video gaming machine. The information terminal may be an MP 3 (MPEG (Motion Picture Experts Group) audio layer 3) player for reproducing a music content represented by a digital signal, or a personal computer 6 having a display larger in size than that of the multi-function mobile telephone 2 as shown in FIG. 3. In this way, the user views in detail each site on a large display screen of the personal computer 6.

The relay apparatus for converting the telephone number of the multi-function mobile telephone 2 into the ID code is not limited to the DNS server owned by the provider. The relay apparatus may be the gateway in the NOC 13 as shown in FIG. 3. When the gateway in the NOC 13 serves as the relay apparatus, the content providing apparatus 4 receives the same ID code regardless of whether the multi-function mobile telephone 2 or the information terminal connected thereto accesses the content providing apparatus 4. The content providing apparatus 4 needs no conversion table for ID code to ID code conversion, and work load on the content providing apparatus 4 is thus reduced.

Figure 4:
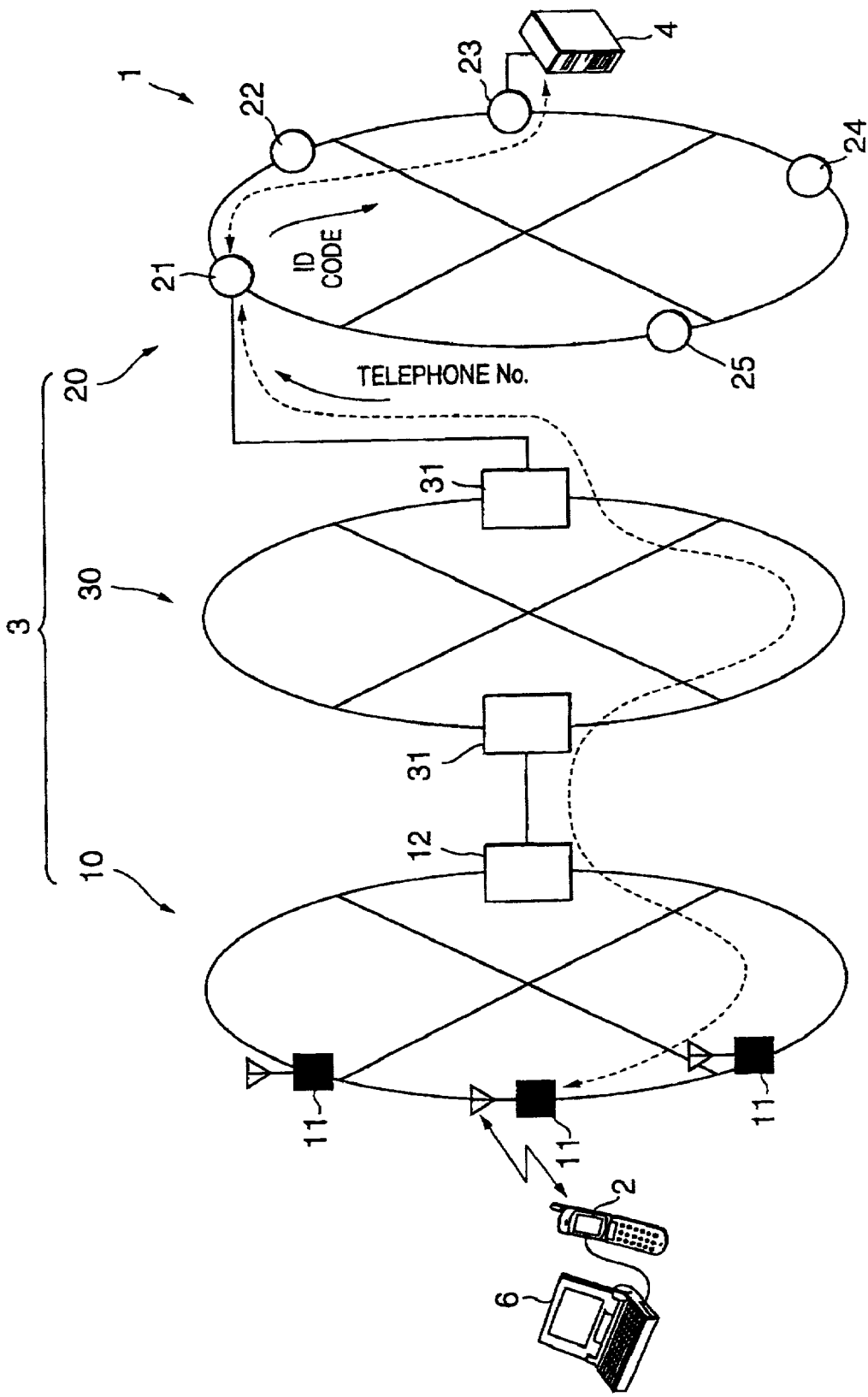
FIG. 4 is a system diagram showing another modification of the content providing system of the present invention.

The NOC, at which the DNS server for converting the telephone number of the multi-function mobile telephone 2 into the ID code is arranged, is not limited to the NOC of the provider operated by the mobile telephone service company owing the subscriber telephone network 10. Referring to FIG. 4, the NOC may be a NOC 21 of a provider run by an operator different from the mobile telephone service company. In this case, a computer 6 connected to the multi-function mobile telephone 2 is connected to an access point of the NOC 21 through the subscriber telephone network 10 to which the multi-function mobile telephone 2 belongs, and the general subscriber network 30 for providing wired telephone communication service. Even when the computer 6 is connected to the NOC 21 through both the subscriber telephone network 10 and the general subscriber telephone network 30, the NOC 21 is notified of the telephone number of the multi-function mobile telephone 2. The telephone number is thus converted into the ID code unique to the multi-function mobile telephone 2.

Since the provider owning the NOC 21 will identify the multi-function mobile telephone 2, the provider can bill the fee of the pay content, supplied from the content providing apparatus 4, for the video game supplier. If the fee of the pay content is billed together with the Internet connection fee charged by the provider, payment destinations are unified, and the user is free from inconvenience involved in paying fees when the user receives contents from a number of content providing apparatuses.

The telephone to which the video gaming machine 5 or the personal computer 6 is connected may be a fixed telephone (a multi-function fixed telephone) having an Internet connection capability. The telephone may be the one compatible with an L-mode service provided by NTT EAST CORPORATION and NTT WEST CORPORATION in Japan. An ordinary mobile telephone or an ordinary telephone, having no Internet connection capability, may be used as long as the telephone has the function of notifying the DNS server of the NOC 25 of the telephone number of the caller.

A communication relaying process, a conversion process for converting the telephone number into the ID code, and a transmission process for transmitting the converted ID code, each performed in the relay apparatus, may be performed by installing a software program stored in a storage medium and by causing the relay apparatus to execute the software program. The software program may be supplied to the relay apparatus through a network.

In accordance with the embodiments of the present invention, the information terminal connected to the multi-function mobile telephone receives the content in the same operation as that for the multi-function mobile telephone.

The invention claimed is:

1. A system for providing a content comprising: a content providing apparatus for providing content, the content providing apparatus including a memory; and a relay apparatus connected to a multi-function mobile telephone through a subscriber telephone network, the relay apparatus being operable to convert a telephone number of the multi-function mobile telephone into an ID code unique to the multi-function mobile telephone, wherein communication between the multi-function mobile telephone and the content providing apparatus is performed through the relay apparatus based on the ID code, the relay apparatus comprising a unit that notifies the content providing apparatus of the ID code of the multi-function mobile telephone, wherein the memory of the content providing apparatus is for storing progress of current game playing, so that if a game is suspended during operation, the game may be resumed at a point of suspension by re-accessing the memory of the content providing apparatus, wherein the system further comprises an information terminal connected to the subscriber telephone network using the multi-function mobile telephone, and wherein the content providing apparatus further includes: a unit operable to provide the content to the information terminal and to provide a key code to the information terminal when the content providing apparatus confirms a completed status in response to accessing of the information terminal, the key code for releasing a specific content hidden in a storage medium; and a unit operable to identify the information terminal to which the content is provided based on the ID code notified by the relay apparatus, so that the memory of the content providing apparatus stores the progress of current game playing at the information terminal identified based on the ID code.

2. A system according to claim 1, wherein the information terminal has a display device larger in size than a display device of the multi-function mobile telephone.

3. A system according to claim 2, wherein the communication is performed through the Internet and the relay apparatus is a gateway arranged to the subscriber telephone network to connect the subscriber telephone network to the Internet.

4. A system according to claim 2, wherein the relay apparatus is a DNS server owned by an Internet service provider.

5. A system according to claim 2, wherein the content providing apparatus is an Internet server which provides one or both of a program and data for video gaming.

6. A system according to claim 5, wherein the information terminal connected to the multi-function mobile telephone is a video gaming machine which is operated while monitoring an image presented on the display device thereof.

7. A system for providing a content, comprising: a server connected to a computer network for providing the content; a terminal connected to a telephone communication network and having a telephone number unique thereto; and a relay apparatus for connecting the telephone communication network to the computer network; wherein the relay apparatus comprises: a unit for relaying communications between the terminal and the server, a unit for connecting the terminal to the computer network in response to a dial-up connection request from the terminal, a unit for detecting the telephone number of the terminal, a unit for converting the telephone number into a unique code, and a unit for notifying the server of the unique code; and the server comprises: a unit for providing the content to the terminal and for providing a key code when the server confirms a completed status in response to accessing of the terminal, the key code for releasing a specific content hidden in a storage medium, a memory; and a unit for identifying the terminal to which the content is provided based on the unique code; wherein the server memory is for storing progress of current game playing, so that if a game is suspended during operation, the game may be resumed at a point of suspension by re-accessing the server memory, and the server memory stores the progress of current game playing at the terminal identified based on the unique code.

8. A system according to claim 7, wherein the computer network is the Internet.

9. A system according to claim 7, wherein the terminal comprises a mobile telephone connected to the telephone communication network.

10. A system according to claim 7, wherein the unit for detecting the telephone number of the terminal detects the telephone number of the terminal when the terminal places the dial-up connection request.

11. A system according to claim 7, wherein the server further comprises a unit which performs a fee billing process to the terminal to which the content is provided based on the unique code.

12. A method for providing content, comprising: providing a content providing apparatus for providing content, the content providing apparatus including a memory; providing a relay apparatus operable to be connected to a multi-function mobile telephone through a subscriber telephone network; operating the relay apparatus to convert a telephone number of the multi-function mobile telephone into an ID code unique to the multi-function mobile telephone, wherein communication between the multi-function mobile telephone and the content providing apparatus is performed through the relay apparatus based on the ID code; wherein the memory of the content providing apparatus is operable to store progress of current game playing, so that if a game is suspended during operation, the game may be resumed at a point of suspension by re-accessing the memory of the content providing apparatus; wherein the relay apparatus comprises a unit that notifies the content providing apparatus of the ID code of the multi-function mobile telephone; wherein the method further comprises connecting an information terminal to the subscriber telephone network using the multi-function mobile telephone; wherein the content providing apparatus includes: a unit operable to provide the content to the information terminal and to provide a key code to the information terminal when the content providing apparatus confirms a completed status in response to accessing of the information terminal, the key code for releasing a specific content hidden in a storage medium; and a unit operable to identify the information terminal to which the content is provided based on the ID code notified by the relay apparatus, so that the memory of the content providing apparatus stores the progress of current game playing at the information terminal based on the ID code.

* * * * *

UNITED STATES PATENT AND TRADEMARK OFFICE
CERTIFICATE OF CORRECTION

| | | |
|---|---|---|
| PATENT NO. | : 7,702,807 B2 | Page 1 of 1 |
| APPLICATION NO. | : 10/027561 | |
| DATED | : April 20, 2010 | |
| INVENTOR(S) | : Toru Morita | |

It is certified that error appears in the above-identified patent and that said Letters Patent is hereby corrected as shown below:

Title page;
(57) ABSTRACT, Line 7, "an DNS" should read -- a DNS --.
Col. 1, Line 13, "now widespread" should read -- now in widespread --.
Col. 1, Line 16, "providing" should read -- can provide --.
Col. 1, Line 19, "contents" should read -- content --.
Col. 3, Line 15, "an DNS" should read -- a DNS --.
Col. 3, Line 47, "thereof This" should read -- thereof. This --.
Col. 5, Line 19, "may a mobile" should read -- may be a mobile --.
Col. 7, Line 55, "in an Internet" should read -- in Internet --.
Col. 9, Line 37, "to the this" should read -- to this --.

Signed and Sealed this
Twelfth Day of April, 2011

David J. Kappos
*Director of the United States Patent and Trademark Office*